US012772280B2

(12) United States Patent
Matsumoto et al.

(10) Patent No.: US 12,772,280 B2
(45) Date of Patent: Oct. 20, 2026

(54) WIRELESS COMMUNICATION SYSTEM, WIRELESS COMMUNICATION METHOD, AND NON-TRANSITORY COMPUTER READABLE STORAGE MEDIUM

(71) Applicant: DENSO CORPORATION, Kariya-city (JP)

(72) Inventors: Sho Matsumoto, Kariya-city (JP); Youichi Hayase, Kariya-city (JP); Yuto Honda, Kariya-city (JP); Tadashi Nakashima, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 309 days.

(21) Appl. No.: 18/629,201

(22) Filed: Apr. 8, 2024

(65) Prior Publication Data

US 2025/0031234 A1 Jan. 23, 2025

(30) Foreign Application Priority Data

Jul. 18, 2023 (JP) ................................ 2023-117014

(51) Int. Cl.

| | |
|---|---|
| ***H04W 72/02*** | (2009.01) |
| ***H04W 16/18*** | (2009.01) |
| ***H04W 72/542*** | (2023.01) |

(52) U.S. Cl.

CPC ......... *H04W 72/542* (2023.01); *H04W 16/18* (2013.01)

(58) Field of Classification Search

CPC ... H04W 72/542; H04W 16/18; H04W 16/14; H04W 24/02; H04W 72/0453

See application file for complete search history.

(56) References Cited

U.S. PATENT DOCUMENTS

| | | | | |
|---|---|---|---|---|
| 6,122,291 | A | 9/2000 | Robinson et al. | |
| 9,037,147 | B2 * | 5/2015 | Tabrizi | H04W 88/04 455/67.11 |
| 2005/0148298 | A1 * | 7/2005 | Ma | H04W 24/00 455/41.2 |
| 2006/0089149 | A1 | 4/2006 | Kizu et al. | |
| 2014/0080534 | A1 * | 3/2014 | Farhadi | H04W 88/04 455/509 |
| 2022/0240069 | A1 * | 7/2022 | Su | H04B 7/0857 |
| 2023/0217301 | A1 * | 7/2023 | Lee | H04W 4/40 |

* cited by examiner

*Primary Examiner* — Lan-Huong Truong

(74) *Attorney, Agent, or Firm* — Posz Law Group, PLC

(57) ABSTRACT

A slave device is determined as a sharing target to which sharing of the channel map is executed according to a communication state of the wireless communication between the master device and each of a plurality of slave devices. When the number of slave devices determined as the sharing target to which the sharing of the channel map is executed is small, the timing for executing the sharing of the channel map is set to be advanced as a whole of the slave devices determined as the sharing target, compared with a case where the number of slave devices determined as the sharing target is large.

17 Claims, 10 Drawing Sheets

FIG. 7

| COM PERIOD/ SlaveNo | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| S1 (TARGET) | UPDATE | | | | | | UPDATE | | | | | | UPDATE | | |
| S2 (TARGET) | | UPDATE | | | | | | UPDATE | | | | | | UPDATE | |
| S3 (TARGET) | | | UPDATE | | | | | | UPDATE | | | | | | UPDATE |
| S4 (TARGET) | | | | UPDATE | | | | | | UPDATE | | | | | |
| S5 (TARGET) | | | | | UPDATE | | | | | | UPDATE | | | | |
| S6 (TARGET) | | | | | | UPDATE | | | | | | UPDATE | | | |

FIG. 8

| COM PERIOD/ SlaveNo | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| S1 (NOT TARGET) | | | | | | | | | | | | | | | |
| S2 (TARGET) | UPDATE | | | | | UPDATE | | | | | UPDATE | | | | |
| S3 (TARGET) | | UPDATE | | | | | UPDATE | | | | | UPDATE | | | |
| S4 (TARGET) | | | UPDATE | | | | | UPDATE | | | | | UPDATE | | |
| S5 (TARGET) | | | | UPDATE | | | | | UPDATE | | | | | UPDATE | |
| S6 (NOT TARGET) | | | | | | | | | | | | | | | |

FIG. 11

| COM PERIOD/ SlaveNo | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| S1 (NOT TARGET) | | | | | | | | | | | | | | | |
| S2 (NOT TARGET) | | | | | | | | | | | | | | | |
| S3 (TARGET) | UPDATE | | | | | UPDATE | | | | | UPDATE | | | | |
| S4 (TARGET) | UPDATE | | | | | UPDATE | | | | | UPDATE | | | | |
| S5 (TARGET) | UPDATE | | | | | UPDATE | | | | | UPDATE | | | | |
| S6 (NOT TARGET) | | | | | | | | | | | | | | | |

WIRELESS COMMUNICATION SYSTEM, WIRELESS COMMUNICATION METHOD, AND NON-TRANSITORY COMPUTER READABLE STORAGE MEDIUM

CROSS REFERENCE TO RELATED APPLICATION

The present application claims the benefit of priority from Japanese Patent Application No. 2023-117014 filed on Jul. 18, 2023. The entire disclosure of the above application is incorporated herein by reference.

TECHNICAL FIELD

The present disclosure relates to a wireless communication system, a wireless communication method, and a non-transitory computer readable storage medium for a wireless communication program, in which a master device performs wireless communication with a slave device via one communication channel that is sequentially selected from a plurality of communication channels.

BACKGROUND

A type of wireless communication system is known, for example, according to a conceivable technique. In the wireless communication system of the conceivable technique, when a packet error occurs in a reception signal of a wireless communication device, and the RSSI value of the wireless signal of the packet is larger than a predetermined threshold Th1, the wireless communication device determines that the reception operation for receiving the packet is a reception error due to interference with other electric waves. Then, the wireless communication device counts the number of receptions and the number of reception errors, and stores the frequency of reception errors due to the interference in each frequency channel (i.e., a value obtained by dividing the number of reception errors by the number of receptions). If the frequency of reception errors exceeds the threshold Th2, the wireless communication device determines that an interference source exists in the frequency channel for which the frequency of reception errors due to the interference exceeds the threshold Th2, and stores the frequency channel as an unusable channel.

SUMMARY

According to an example, a slave device may be determined as a sharing target to which sharing of the channel map is executed according to a communication state of the wireless communication between the master device and each of a plurality of slave devices. When the number of slave devices determined as the sharing target to which the sharing of the channel map is executed is small, the timing for executing the sharing of the channel map may be set to be advanced as a whole of the slave devices determined as the sharing target, compared with a case where the number of slave devices determined as the sharing target is large.

BRIEF DESCRIPTION OF THE DRAWINGS

The above and other objects, features and advantages of the present disclosure will become more apparent from the following detailed description made with reference to the accompanying drawings. In the drawings:

FIG. 7 is a timing flow chart showing an example of the update timing of the channel map of each slave device when all slave devices are the target of the channel map control;

FIG. 8 is a timing flow chart showing an example of the update timing of the channel map of each slave device when some slave devices are the target of the channel map control;

FIG. 11 is a timing flow chart illustrating an example of the update timing of the channel map of each slave device when a slave device whose communication state has deteriorated is the target of the channel map control according to the second embodiment.

DETAILED DESCRIPTION

Figure 1:
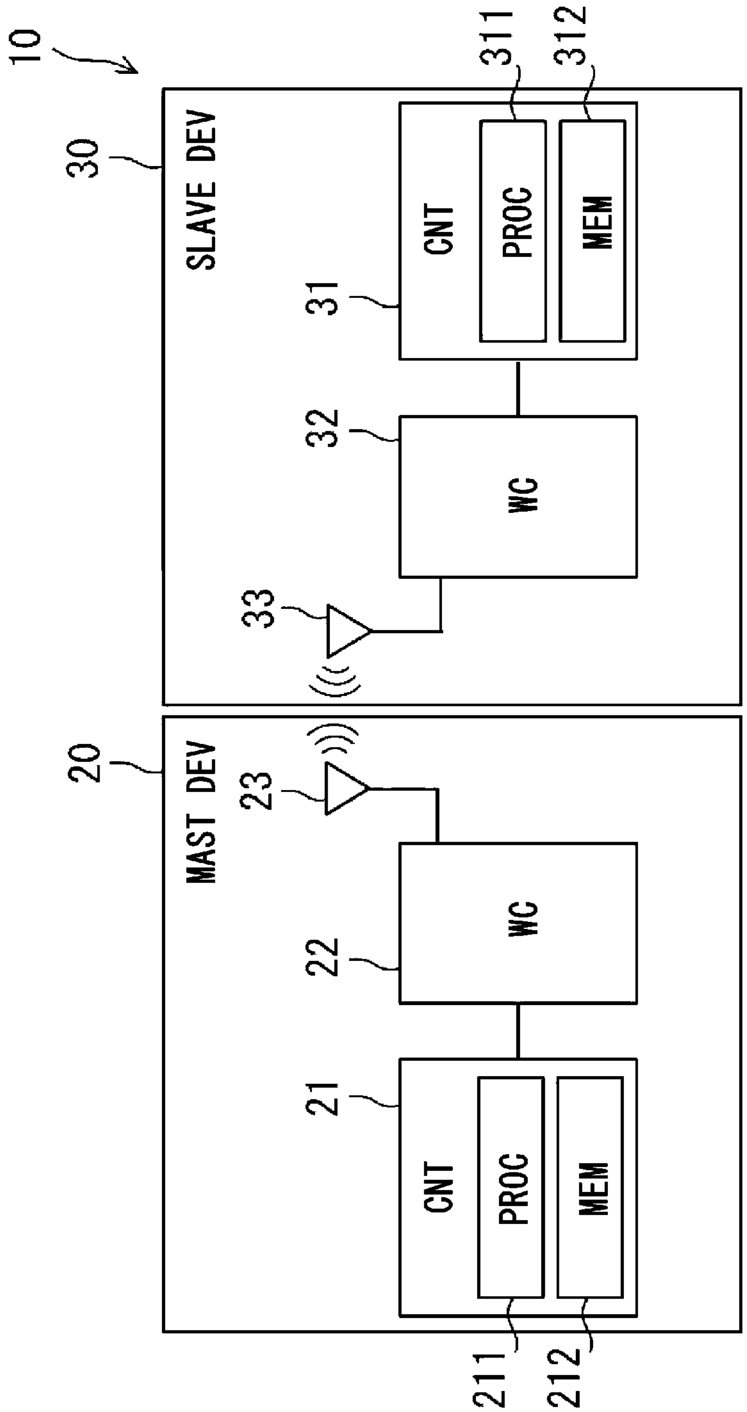
FIG. 1 is a block diagram showing a schematic configuration of a wireless communication system according to a first embodiment.

As described above, in the wireless communication system according to the conceivable technique, a frequency channel whose communication quality has reduced due to interference with other electric waves is set as an unusable channel. Further, in the wireless communication system according to the conceivable technique, a frequency channel that is set as an unusable channel is returned to a usable frequency channel after a predetermined period has elapsed. Such control of setting a frequency channel as an unavailable channel or returning the unavailable channel to an available channel is hereinafter referred to as channel map control in the embodiments.

Here, when the wireless communication system includes at least one master device and at least two or more slave devices, and each of the multiple slave devices performs wireless communication with the master device, it is necessary to perform a channel map control for each of the multiple slave devices, the channel map control is mainly realized by a computer equipped with a processor through software processing according to a program. Therefore, as the number of slave devices increases, the computer processing load for the channel map control increases. Therefore, when the channel map control is to be performed for all slave devices, it may be necessary to use a high-performance computer, which may increase the cost of the wireless communication system.

In view of the above described points, the present embodiments provide a wireless communication system, a wireless communication method, and a non-transitory computer readable storage medium for a wireless communication program, which can ensure the effectiveness of channel map control in the wireless communication system in which a master device communicates with a plurality of slave devices while suppressing the manufacturing cost of the wireless communication system from increasing.

In order to achieve the above object, in a wireless communication system according to the present embodiments, a master device performs wireless communication with each of a plurality of slave devices via one communication channel sequentially selected from a plurality of communication channels. In the wireless communication system, the plurality of slave devices are arranged and a master device performs wireless communication with each of the plurality of slave devices.

The wireless communication system includes:

a communication channel determination unit that determines a communication quality of each communication channel for each slave device when the master device communicates wirelessly with the plurality of slave devices, and determines the communication channel to be used for the wireless communication based on a determination result of the communication quality of each communication channel;

a channel map share unit that causes the master device to transmit a channel map indicating the one communication channel determined by the communication channel determination unit to the slave device, and causes the master device and the slave device to share the channel map;

a slave device determination unit that determines the slave device as a sharing target to which the sharing of the channel map with the master device is executed by the channel map share unit according to a communication state of the wireless communication between the master device and each of the plurality of slave devices; and a timing change unit that advances a timing to execute sharing the channel map by the channel map share unit as a whole of slave devices determined as the sharing target in a case where a numerical number of slave devices determined by the slave device determination unit is small, compared with a case where the numerical number of slave devices determined by the slave device determination unit is large.

Further, a wireless communication method according to the present embodiments is a wireless communication method in which a master device performs wireless communication with each of a plurality of slave devices via one communication channel that is sequentially selected from a plurality of communication channels.

The master device performs the wireless communication with each of the plurality of slave devices.

The wireless communication method includes:

a communication channel determination step for determining a communication quality of each communication channel for each slave device when the master device communicates wirelessly with the plurality of slave devices, and determines the communication channel to be used for the wireless communication based on a determination result of the communication quality of each communication channel;

a channel map share step for causing the master device to transmit a channel map indicating the one communication channel determined in the communication channel determination step to the slave device, and causing the master device and the slave device to share the channel map;

a slave device determination step for determining the slave device as a sharing target to which the sharing of the channel map with the master device is executed in the channel map share step according to a communication state of the wireless communication between the master device and each of the plurality of slave devices; and a timing change step for advancing a timing to execute sharing the channel map in the channel map share step as a whole of slave devices determined as the sharing target in a case where a numerical number of slave devices determined in the slave device determination step is small, compared with a case where the numerical number of slave devices determined in the slave device determination step is large.

Further, a wireless communication program according to the present embodiments, which is executed by at least one processor, is a wireless communication program in which a master device performs wireless communication with a plurality of slave devices via one communication channel that is sequentially selected from a plurality of communication channels.

The master device performs the wireless communication with each of the plurality of slave devices.

When executing the wireless communication program, the wireless communication program causes the at least one processor to provide:

a communication channel determination function for determining a communication quality of each communication channel for each of the plurality of slave devices when the master device communicates wirelessly with the plurality of slave devices, and determining the communication channel to be used for the wireless communication based on a determination result of the communication quality of each communication channel;

a channel map share function for causing the master device to transmit a channel map indicating the one communication channel determined by the communication channel determination function to the slave device, and causes the master device and the slave device to share the channel map;

a slave device determination function for determining the slave device as a sharing target to which the sharing of the channel map with the master device is executed by the channel map share function according to a communication state of the wireless communication between the master device and each of the plurality of slave devices; and a timing change function for advancing a timing to execute sharing the channel map by the channel map share function as a whole of slave devices determined as the sharing target in a case where a numerical number of slave devices determined by the slave device determination function is small, compared with a case where the numerical number of slave devices determined by the slave device determination function is large.

As described above, in the wireless communication system, the wireless communication method, and the non-transitory computer readable storage medium for the wireless communication program according to the present embodiments, the slave device as a sharing target, to which the sharing of the channel map is executed, is determined according to the communication status of the wireless communication between the master device and each of the plurality of slave devices. In this way, in the present embodiments, instead of always performing channel map control on all slave devices, a slave device, to which the channel map control is executed, is determined according to the communication state. Therefore, the processing load when performing the channel map control can be suppressed. As a result, the channel map control can be executed without using a high-performance computer, and an increase in system costs can be avoided.

Furthermore, in the wireless communication system, the wireless communication method, and the non-transitory computer readable storage medium for the wireless communication program according to the present embodiments, a timing to execute sharing the channel map is advanced as a whole of slave devices determined as the sharing target in a case where a numerical number of slave devices determined as the sharing target to which the channel map control is executed is small, compared with a case where the numerical number of slave devices determined as the sharing target is large. Therefore, for example, if there is a slave device whose communication state has deteriorated, the timing to execute sharing the channel map can be advanced by reducing the numerical number of slave devices as the sharing target to which the sharing of the channel map is executed. As a result, it is possible to quickly improve the communication state of a slave device whose communication state has deteriorated. In this way, the effectiveness of the channel map control can be ensured.

The reference signs and/or numerals in parentheses are merely added to indicate examples of correspondence relationships with concrete structures in the below-described embodiments in order to facilitate the understanding of the present disclosure, which has no intention to limit the scope of the present disclosure in any manner.

Hereinafter, preferred embodiments of the present disclosure will be described with reference to the drawings. Note that the same or similar components are denoted by the same reference numerals throughout a plurality of drawings, and description thereof may be omitted. When only a part of a configuration is described in each embodiment, the configurations of other embodiments previously described can be applied to the other parts of the configuration. In addition to the combination of the configurations explicitly described in the description of each embodiment, the configurations of multiple embodiments may be partially combined even if not explicitly described as long as there is no difficulty in the combination.

First Embodiment

A wireless communication system according to the present embodiment includes at least one master device and at least two slave devices. Each of the at least two slave devices communicates wirelessly with the at least one master device. At least one of the master device or the slave devices can be used by being mounted on a mobile body. The mobile body include, for example, a vehicle such as an automobile and a railroad vehicle, a flying object such as an electric vertical take-off and landing aircraft and a drone, a ship, a construction machine, and a agricultural machine.

As a specific application in vehicles, the wireless communication system according to the present embodiment is applied to a battery management system that manages batteries mounted as battery packs in electrified vehicles, such as, for example, electric vehicles, hybrid vehicles, and plug-in hybrid vehicles and the like. When applied to a battery management system, for example, a master device is connected to a battery control device, and a plurality of slave devices are respectively connected to a monitor device provided in a plurality of battery stacks that constitute a battery pack. In this case, both the master device and the plurality of slave devices are mounted on the vehicle.

Each monitoring device provided for each of the plurality of battery stacks acquires battery information such as the voltage and the current of each battery cell included in the corresponding battery stack and the temperature of the battery stack using various sensors and the like. When each of the monitoring devices receives data requesting the battery information from the battery control device via the wireless communication system, each of the monitoring devices transmits the obtained battery information to the battery control device via the wireless communication system. Based on the obtained battery information, the battery control device calculates the state of charge (i.e., SOC) of the entire battery stack, drives the heating and cooling mechanism to adjust the temperature of the battery pack within an appropriate range, and determines whether or not it is necessary to perform a so-called equalization process to equalize the voltages of the battery cells. When the battery control device determines that it is necessary to perform the equalization process to at least one battery stack, the battery control device instructs the corresponding monitoring device to perform the equalization process via the wireless communication system. In addition, each monitoring device performs processing to determine anomaly in various sensors and anomaly in the operation of the monitoring device, and if an anomaly is determined, the monitoring device transmits anomaly information to the battery control device via the wireless communication system.

The wireless communication system according to the present embodiment may be applied to a vehicle smart key system or a vehicle tire pressure monitoring system. When the master device is applied to the vehicle smart key system, the master device is mounted on the vehicle and is connected to a control device that controls locking and unlocking of a vehicle door and turning on and off of a drive source, such as an engine of the vehicle. The multiple slave devices are mounted on portable keys or portable terminals carried by multiple users. When the master device is applied to the vehicle tire pressure monitoring system, the master device is mounted on the vehicle, and is connected to a control device, which displays the tire pressure and outputs a warning in response to the tire pressure being abnormal. The plurality of slave devices are provided within each tire and are connected to an air pressure detection device also provided within each tire.

The wireless communication system according to the present embodiment may be applied to a vehicle diagnosis system. In this case, for example, a plurality of slave devices are connected to a plurality of in-vehicle equipment equipped with a self-diagnosis function, and a master device is connected to a diagnostic control device installed at a service factory. In these examples, at least one of the master device and the plurality of slave devices is located at a fixed place, and/or at least one is mounted on a vehicle.

However, application examples of the communication system according to the present embodiment are not limited to vehicles, alternatively, the communication system may be applicable to systems that control and manage various equipment in mobile objects other than vehicles, i.e., objects including aerial object such as drones, ships, construction machinery, agricultural machinery and the like. Furthermore, the communication system according to the present embodiment is also applicable to a system for controlling and managing various types equipment in a structure such as buildings and production facility such as factories.

FIG. 1 is a block diagram showing a schematic configuration of a wireless communication system 10. The wireless communication system 10 includes a master device 20 and a slave device 30, both of which are mounted on, for example, a vehicle (automobile). The master device 20 and the slave device 30 may be configured to be arranged in a common housing, or may be configured to be arranged in different housings. The number of master devices 20 may be one or multiple. When a plurality of master devices 20 are provided, each of the plurality of master devices 20 may communicate with a plurality of slave devices 30 belonging to different groups, or the plurality of master devices 20 may communicate with a plurality of slave devices 30 belonging to the same group. The master device 20 and the slave device 30 perform wireless communication via a communication channel, which is sequentially selected from multiple communication channels, under Bluetooth Low Energy (Bluetooth is a registered trademark, hereinafter referred to as Bluetooth LE) communication.

As an example, the wireless communication system 10 of the present embodiment includes one master device 20 and multiple slave devices 30. In FIG. 1, only one slave device 30 is illustrated in for simplicity of illustration. The multiple slave devices 30 may have the same configuration.

In the wireless communication between the master device 20 and the slave device 30, the frequency band used in short-range communication is, for example, a 2.4 GHz band or a 5 GHz band. Such electric waves in the high frequency band have higher straightness than electric waves in the low frequency band, and are likely to be reflected by a metal body such as a vehicle body. The LF is an abbreviation for Low Frequency. As the short-range communication standard, for example, Bluetooth, Bluetooth LE, and the like can be adopted. As an example, the master device 20 and slave device 30 of this embodiment are configured to be able to perform the wireless communication in accordance with the Bluetooth LE standard (hereinafter referred to as Bluetooth LE communication). Details of the communication method related to communication connection, encrypted communication, and the like are performed according to the sequence defined by the Bluetooth LE standard.

The master device 20 includes a control circuit (i.e., CNT) 21, a wireless communication circuit (i.e., WC) 22, and an antenna 23, as shown in FIG. 1. In addition to the elements described above, the master device 20 includes an input-output interface for wired or wireless communication with devices other than the slave device 30, and a bus line. Here, processing such as a channel map control process, a channel map generation process, and a channel map share process, which will be described later, may be performed by the control circuit 21, or a part or all of these processing may be performed by a separate control device disposed outside of the master device 20.

The control circuit 21 is, for example, a computer including a processor 211 and a memory 212. The memory 212 includes, for example, RAM and ROM. The RAM is abbreviation for Random Access Memory. The ROM is abbreviation for Read Only Memory.

The processor 211 of the control circuit 21 executes a predetermined process (i.e., a control process) by executing a program stored in the ROM while using the RAM as a temporary storage area. The processor 211 constructs multiple functional units by executing multiple instructions included in the program. There may be a plurality of processors 211. The program storage medium is not limited to the ROM. For example, various storage medium such as an HDD or an SSD may be used. HDD is an abbreviation for Hard Disk Drive. The SSD is an abbreviation for Solid State Drive.

The processor 211 is, for example, a CPU, a MPU, a GPU, a DFP, or the like. The CPU is an abbreviation for Central Processing Unit. The MPU is an abbreviation for Micro-Processing Unit. The GPU is an abbreviation for Graphics Processing Unit. The DFP is an abbreviation for Data Flow Processor. The control circuit 21 may be implemented by combining multiple types of calculation processing units such as a CPU, an MPU, and a GPU. Alternatively, the control circuit 21 may be realized as an SoC. The SoC is an abbreviation for System on Chip. The control circuit 21 may be implemented using an ASIC or FPGA. The ASIC is an abbreviation for Application Specific Integrated Circuit. The FPGA is an abbreviation for Field-Programmable Gate Array.

The control circuit 21 generates a command for requesting the slave device 30 to perform process (for example, a command for requesting data, a command for requesting execution of predetermined process, or the like), and transmits transmission data including the command to the wireless communication circuit 22 as a transmission packet. The control circuit 21 receives a packet transmitted from the slave device 30 and executes a predetermined process based on data included in the received packet. The wireless communication performed by the master device 20 and the slave device 30 is packet communication.

The wireless communication circuit 22 includes a RF circuit (not shown) for wirelessly transmitting and receiving the packet. The wireless communication circuit 22 has a transmission function of modulating a transmission signal and oscillating at the frequency of a RF signal. The wireless communication circuit 22 has a reception function of demodulating the received signal. RF is an abbreviation for Radio Frequency.

The wireless communication circuit 22 modulates the packed including the data transmitted from the control circuit 21, and transmits the packet to the slave device 30 via the antenna 23. The control circuit 21 outputs, to the wireless communication circuit 22, data obtained by encrypting the transmission data such as battery information request data using, for example, encryption information to be exchanged in a connection establishment process described later. The wireless communication circuit 22 adds data required for the wireless communication, such as communication control information, to the transmission packet, and transmits the packet. The data necessary for wireless communication includes, for example, an identifier (ID), a sequence number, a next sequence number, and an error detection code. The wireless communication circuit 22 may control a data size, a communication format, a schedule, error detection, and the like of communication between the master device 20 and the slave device 30. The control circuit may perform a control related to the above-described communication.

The wireless communication circuit 22 receives the packet transmitted from the slave device 30 via the antenna 23 and demodulates the packet. Then, the demodulated packet is transmitted to the control circuit 21. The antenna 23 converts an electric signal into electric waves and emits the electric waves into a space. The antenna 23 receives a electric wave propagating in space and converts the electric wave into an electric signal.

The slave device 30 includes a control circuit (i.e., CNT) 31, a wireless communication circuit (i.e., WC) 32, and an antenna 33, as shown in FIG. 1. In addition to the elements described above, the slave device 30 includes an input-output interface for wired or wireless communication with devices other than the master device 20, and a bus line. The control circuit 31 has the similar configuration to the control circuit 21 of the master device 20. The control circuit 31 includes a processor 311 and a memory 312, for example. The memory 312 includes, for example, a RAM and a ROM.

The control circuit 31 performs the requested processing (e.g., the response processing for obtaining and returning requested data, execution processing of the requested processing, and the like) based on the request command obtained via the wireless communication circuit 32. For example, when the request command included in the received data is a request to transmit the battery information, the control circuit 31 of the slave device 30 transmits the transmission request to the monitoring device of the corresponding battery stack, and acquires the battery information from the monitoring device. then, the control circuit 31 transmits, as a response to the request, the data encrypted using the encryption information including the processing result (for example, the acquired battery information), to the wireless communication circuit 32. The control circuit 31 can also control, for example, equipment mounted on a vehicle according to requested processing.

The wireless communication circuit 32 includes a RF circuit (not shown) for wirelessly transmitting and receiving the packet. The wireless communication circuit 32 has a transmission function and a reception function, similarly to the wireless communication circuit 22. The wireless communication circuit 32 receives the packet transmitted from the master device 20 via the antenna 33 and demodulates the packet. Then, the data included in the demodulated packet is transmitted to the control circuit 31. The wireless communication circuit 32 modulates the packed including the data transmitted from the control circuit 31, and transmits the packet to the master device 20 via the antenna 33. The wireless communication circuit 32 adds data required for the wireless communication, such as communication control information, to the transmission packet, and transmits the packet.

The wireless communication circuit 32 may control the data size, the communication format, the schedule, the error detection, and the like of communication between the master device 20 and the slave device 30. The control related to these communications may be performed by the control circuit 31. The antenna 33 converts an electric signal into electric waves and emits the electric waves into space. The antenna 33 receives an electric wave propagating in space and converts the electric wave into an electric signal.

Figure 2:
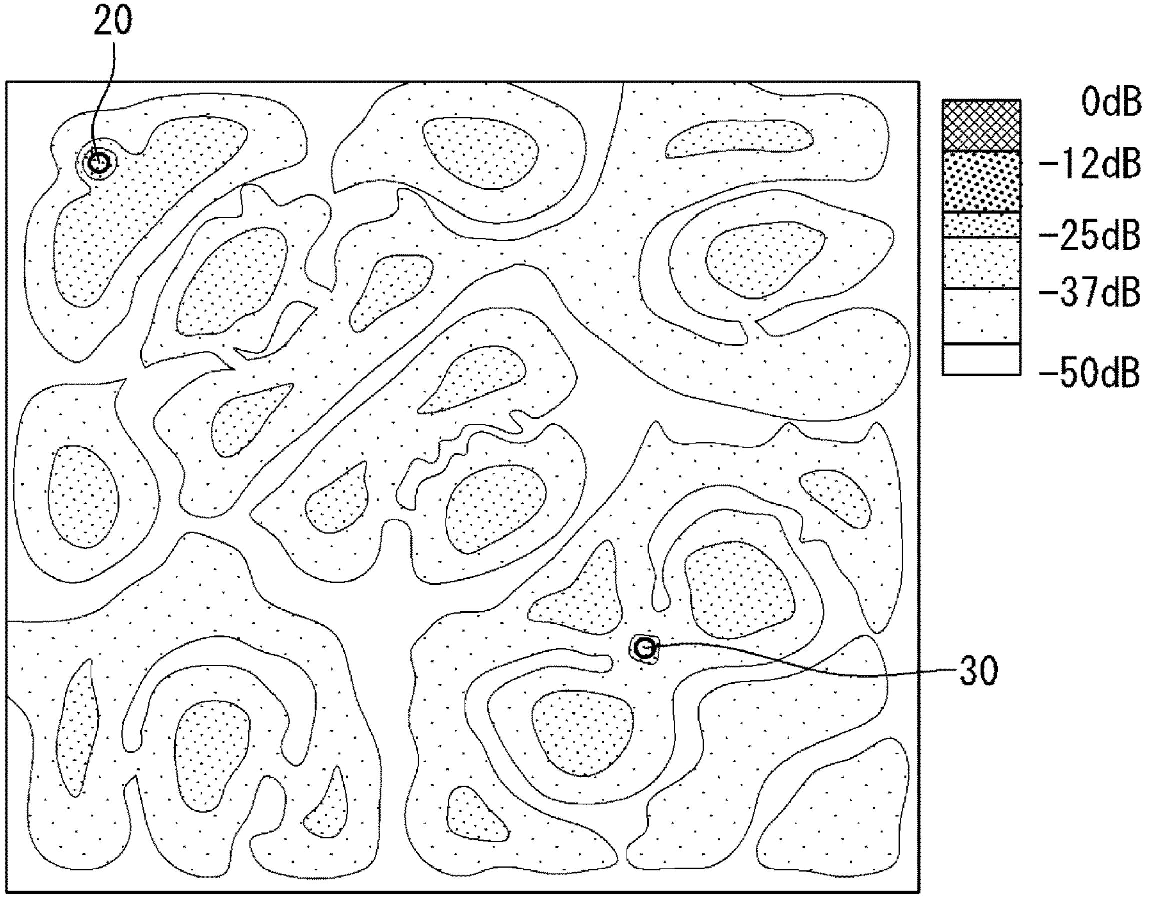
FIG. 2 is a diagram showing one example of the electric field strength distribution of the communication environment between the master device and the slave device.

FIG. 2 is a diagram showing one example of the electric field strength distribution of the communication environment between the master device 20 and the slave device 30. FIG. 2 shows an electromagnetic field simulation result at a predetermined timing at a predetermined frequency. In the following, the electric field strength distribution may be referred to as electric field distribution.

The master device 20 and the slave device 30 are arranged at predetermined positions in the vehicle, for example. When a wireless electric wave signal with a predetermined frequency is transmitted from the master device 20 and slave device 30 placed at predetermined positions, interference between the transmission wave and reflection wave and interference with external noise may generate a portion with high electric field strength and another portion with low electric field strength in the usage environment. The reflection wave is generated by reflection from metal elements of the vehicle that are present around the master device 20 and slave device 30, such as reflection from the vehicle body, reflection from the metal casing, reflection from the harness, and the like. For this reason, the communication environment between the master device 20 and the slave device 30 has a plurality of so-called NULL points, which are portions with high electric field strength and portions with low electric field strength, as shown in FIG. 2.

In the electric field distribution with respect to the master device 20, when the slave device 30 is located in an area where the electric field strength is low or in the vicinity thereof, there is a high possibility that the slave device 30 cannot correctly receive the wireless communication signal transmitted from the master device 20, and a communication error may occur. A communication channel in which such a communication error is likely to occur corresponds to a communication channel in which the communication quality is degraded.

Here, when the master device 20 and the slave device 30 perform the wireless communication via one communication channel sequentially selected from a plurality of communication channels, each communication channel has a different frequency, so that the electric field distribution of each communication channel may also change. As a result, the communication quality may vary between communication channels.

Figure 3:
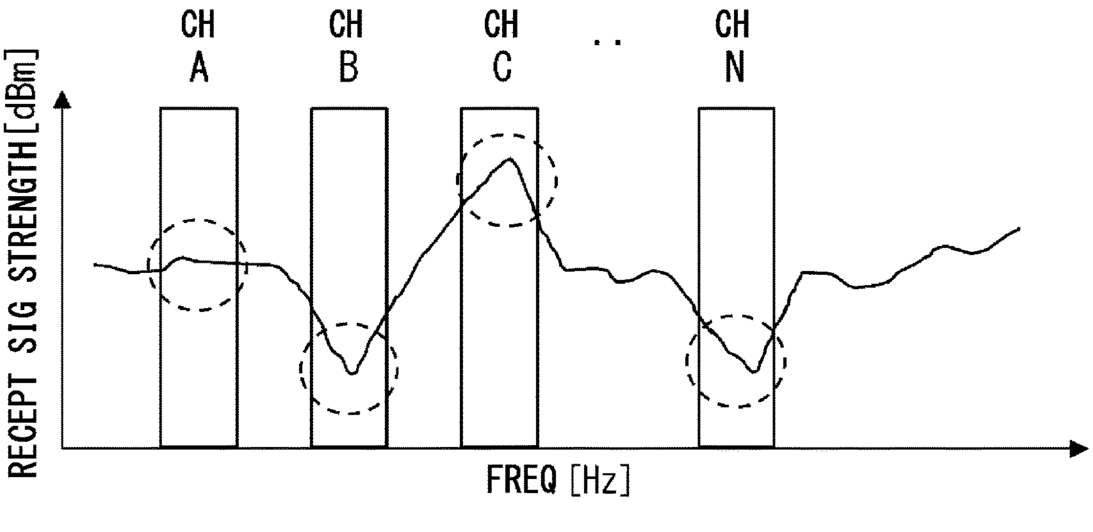
FIG. 3 is a diagram showing an example of received signal strength of each communication channel.

For example, as shown in FIG. 3, in the wireless communication via the communication channel A, reception power (i.e., reception signal strength), which is one of the parameters indicating the communication quality, is excellent. Furthermore, in the wireless communication via the communication channel C, the reception power shows a very high value. Therefore, when the master device 20 and the slave device 30 use the communication channels A and C with excellent or very high communication quality, the master device 20 and the slave device 30 can perform the high-quality wireless communication in which communication errors are sufficiently suppressed. On the other hand, in the wireless communication via the communication channels B and N, the reception power is low. For this reason, when the master device 20 and the slave device 30 use the communication channels B and N with reduced communication quality, there is a high possibility that a communication error will occur in the wireless communication. Here, in FIG. 3, in order to facilitate understanding, an example of received signal strength with respect to frequency is shown by a solid line.

Therefore, it may be preferable that the wireless communication between the master device 20 and the slave device 30 is performed using a communication channel that can perform the high quality wireless communication, avoiding a communication channel where the communication quality has reduced.

The electric field distribution between the master device 20 and the slave device 30 changes due to an external environment (noise from the outside or the like), vibration of the master device 20 and/or the slave device 30 (including vibration of a harness), or the like. Therefore, when the master device 20 and/or the slave device 30 are mounted on a mobile body such as a vehicle, the electric field distribution of the communication environment between the master device 20 and the slave device 30 depends on, for example, the state of the mobile body and the state of the surrounding environment of the mobile body. As a result, the communication channel with high communication quality and the communication channel with low communication quality are not fixed channels and may change every moment. Therefore, in response to a reduction in the communication quality, the corresponding communication channel is deleted from multiple communication channels used for the wireless communication, and in response to the recovery of communication quality, the corresponding communication channel is restored as one of multiple communication channels used for the wireless communication.

Figure 4:
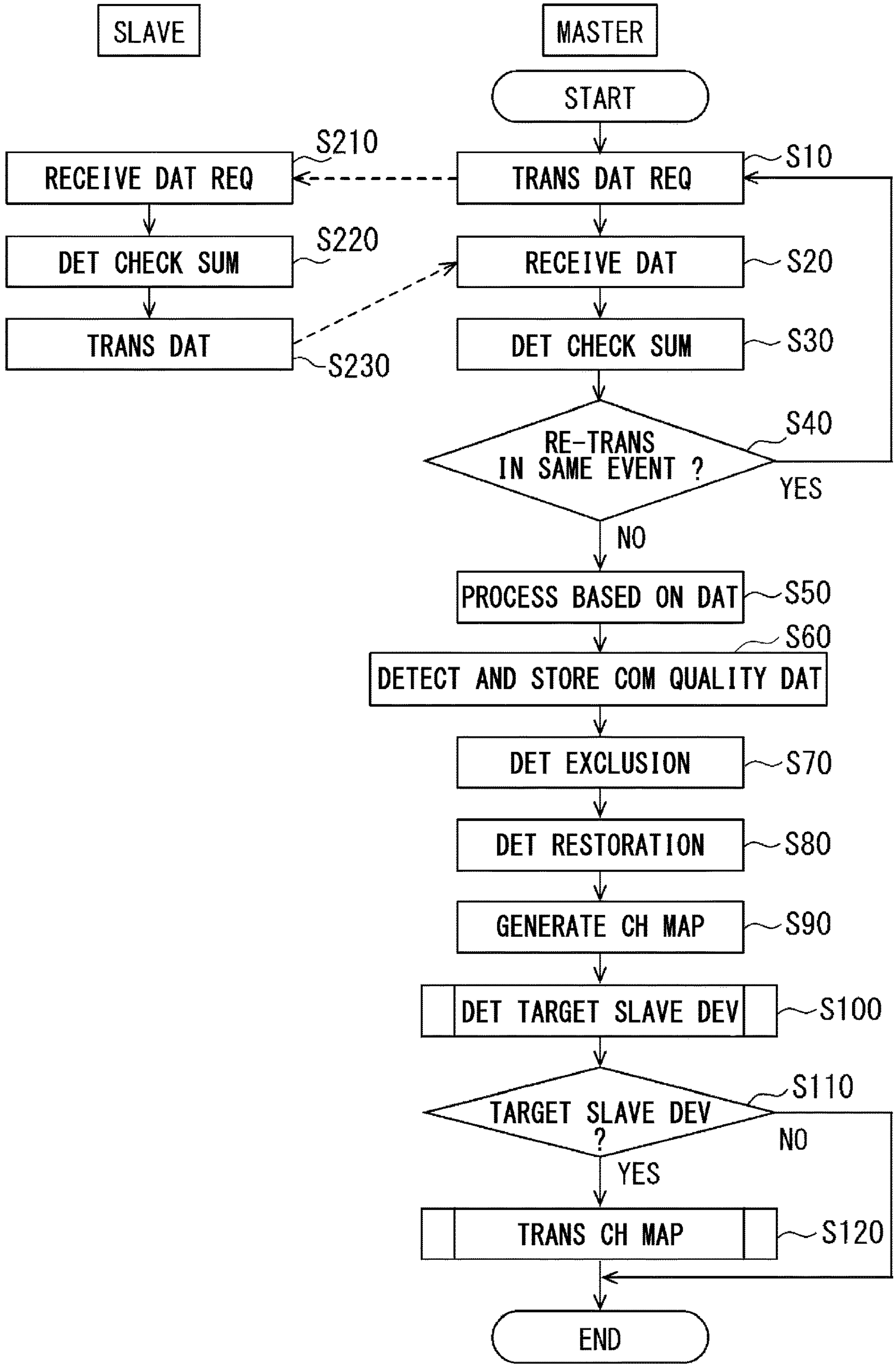
FIG. 4 is a flowchart showing an example of a communication sequence between a master device and a slave device.
Figure 5:
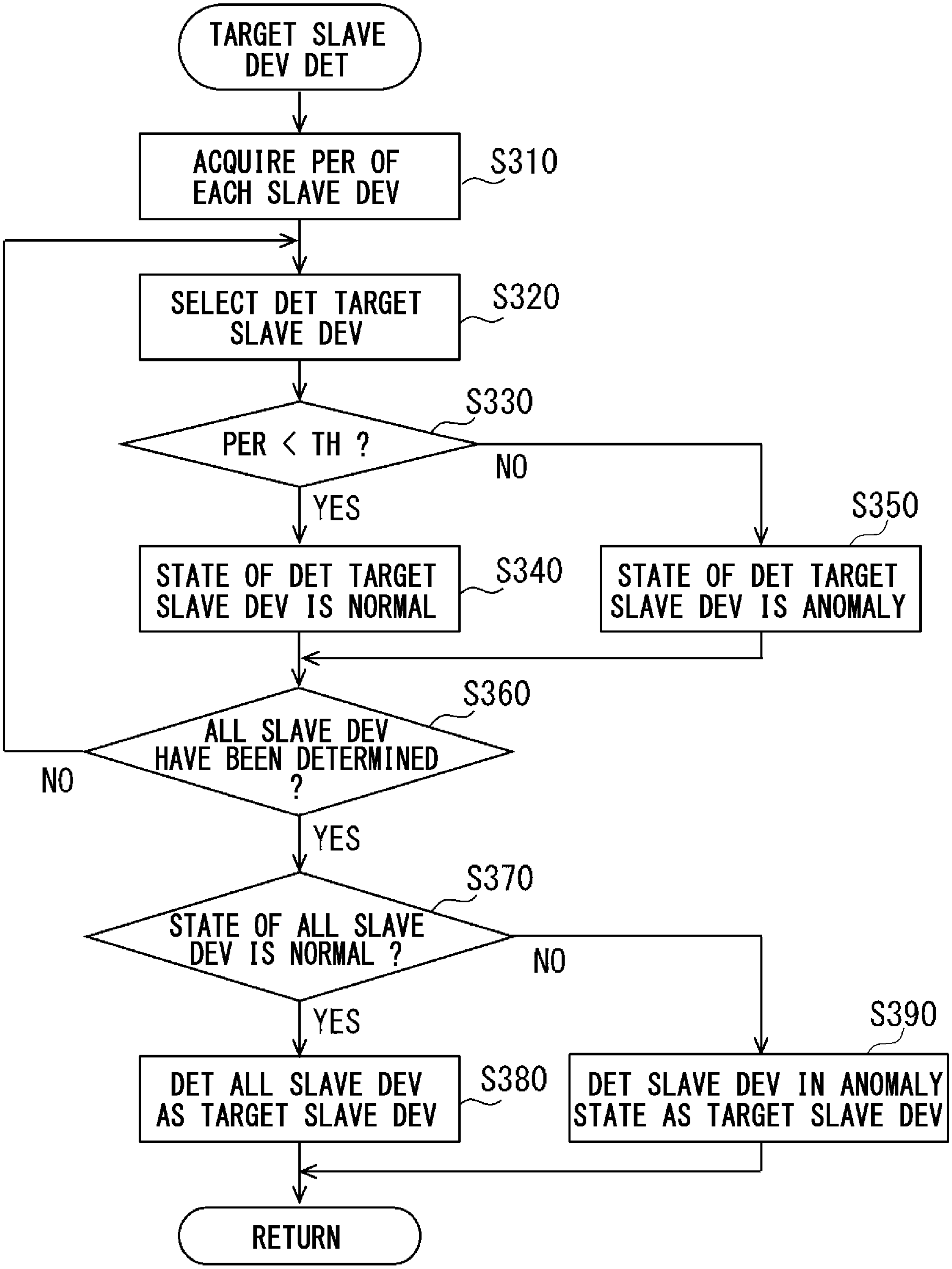
FIG. 5 is a flowchart illustrating an example of the target slave device determination process in the flowchart of FIG. 4.

In the wireless communication system 10 of the present embodiment, as a plurality of communication channels used for wireless communication, a part of the communication channels in which a certain communication quality is ensured are used, other than a communication channel in which the communication quality is reduced due to channel map control, so that a control process for realizing the wireless communication between the master device 20 and the slave device 30 will be explained with reference to a drawing showing a communication sequence between the master device 20 and the slave device 30 shown in FIG. 5. In FIG. 4, the master device 20 is denoted by MASTER, and the slave device 30 is denoted by SLAVE. Further, FIG. 4 shows a communication sequence executed between the master device 20 and one slave device 30. The master device 20 individually executes the communication sequence shown in FIG. 4 with the plurality of slave devices 30.

First, the master device 20 and the slave device 30 execute a connection establishment process before executing the communication sequence illustrated in FIG. 4. For example, in a case where the wireless communication system 10 is mounted on a vehicle, the connection establishment process is executed when the IG signal is switched from the off state to the on state by a user operation. This connection establishment process is executed between the master device 20 and all of the slave devices 30, which correspond to connection targets of the wireless communication with the master device 20. When a constant connection is required between the master device 20 and the slave device 30, the connection establishment process is performed only once at a predetermined time. When an error occurs during communication and the wireless communication connection between the master device 20 and the slave device 30 is disconnected, a connection establishment process may be performed for reconnection.

In the connection establishment process, the slave device 30 may execute an advertising operation of transmitting an advertising signal via a communication channel for advertising purpose, and the master device 20 may execute a scanning operation for scanning the advertising signal. The communication channel for advertising includes a plurality of communication channels (for example, three in the case of Bluetooth LE). When the master device 20 receives an advertising signal through one of the communication channels through a scanning operation, the master device 20 transmits a connection request to the slave device 30 that has transmitted the advertising signal. Accordingly, a communication connection is established between the master device 20 and the slave device 30. After the communication connection is established, the master device 20 and the slave device 30 exchange encryption information to be used for data communication and perform a sharing process of initial information related to frequency channel hopping. The initial information includes, for example, a channel map, a hopping pattern or a function for hopping.

When the connection establishment process is completed, the master device 20 and slave device 30 execute the communication sequence shown in the flowchart of FIG. 4 for each communication event that occurs periodically. In this communication sequence, the data communication is performed via a data communication channel that is sequentially selected from a plurality of communication channels by frequency channel hopping for each communication event. The master device 20 sequentially allocates communication periods to the plurality of slave devices 30 for each communication event, so that sub-communication events for communicating with each of the plurality of slave devices 30 occur in a predetermined order.

As shown in FIG. 4, the master device 20 transmits, for example, a data request command, that is, a data request, to the slave device 30 in step S10. Here, in addition to the data request, the master device 20 can also transmit, for example, a request to execute a predetermined process. When the slave device 30 receives the data request in step S210, in step S220, the slave device 30 performs, for example, a checksum determination based on the error detection code included in the received data request in order to confirm whether or not the data request has been properly received. When the slave device 30 determines in the process of step S220 that the data request cannot be received properly based on the checksum determination result, for example, in step S230, the slave device 30 transmits a signal indicating that the data request cannot be received properly, or a signal for requesting retransmission of the data request. On the other hand, when the slave device 30 determines in the process of step S220 that the data request has been properly received, in step S230, the slave device 30 performs a predetermined process necessary for response, for example, a process of acquiring and transmitting the requested data.

As described above, the master device 20 and the slave device 30 perform frequency channel hopping for each communication event to switch the communication channel to be used for data communication, and perform transmission and reception of a data request and transmission and reception of requested data. At this time, the master device 20 and the slave device 30 determine the communication channel to be switched by the frequency channel hopping, according to the channel maps that each of the master device 20 and the slave device 30 stores. In Bluetooth LE standard, 37 communication channels are prepared as data communication channels.

In S20, the master device 20 receives the requested data. Then, in S30, the master device 20 performs, for example, checksum determination based on the error detection code included in the received data in order to confirm whether the data has been correctly received. In the following step S40, the master device 20 determines whether or not to execute processing for retransmission within the same communication event when it is determined in the process of step S30 that the data cannot be received correctly or when a signal indicating that the data request cannot be received correctly or a signal for requiring the re-transmission of the data request is received from the slave device 30. For example, the master device 20 may determine execution of retransmission when there is enough time to perform retransmission until the end time of the current communication event (or, sub-communication event), and may determine non-execution of retransmission when there is no enough time until the end time of the current communication event. In S40, when the master device 20 determines to execute the retransmission, the master device 20 executes the process from S10 again. When the data is determined to be correctly received in S30 or the retransmission of data is determined to be not executed within the current communication event in S40, the master device 20 proceeds to S50.

In S50, the master device 20 executes a process based on the information included in the received data. When the data is determined to be not correctly received in S30 and the retransmission of data is determined to be not executed within the current communication event in S40, the master device may omit S50 or execute S50 based on the previously received data.

In S60, the master device 20 detects the received signal strength indicator (RSSI) and the packet error rate (PER) as the characteristic data indicating the communication quality of the signal received from the slave device 30. The RSSI is an index indicating the strength of a signal transmitted from the slave device 30 and received by the master device 20. The PER indicates a ratio of the number of error packets to the number of received packets received by master device 20 in percentage. The master device 20 may detect signal noise ratio (SNR)/signal interference noise ratio (SINR), instead of the RSSI. The SNR/SINR may be detected by, for example, a ratio between an RSSI value when the master device 20 receives a wireless communication signal from the slave device 30 and an RSSI value when the master device 20 does not receive a wireless communication signal. Furthermore, the master device 20 may detect the bit error rate (BER) or the packet arrival rate (PAR) instead of the PER. The master device 20 stores and accumulates at least one of: the detected RSSI or the detected SNR/SINR; the PER; the BER; or the PAR for each communication channel. In addition to or instead of the detection by the master device 20 as described above, the characteristic data indicating the communication quality may also be acquired in the master device 30 by detecting, using the slave device, an RSSI, a PER, or the like from a received wireless communication signal transmitted from the master device 20, and transmitting, using the slave device, the detected RSSI, the detected PER, or the like to the master device 20.

In step S70, the master device 20 determines whether the communication quality of the communication channel used for wireless communication with the slave device 30 has been reduced based on the characteristic data indicating the communication quality of the communication channel detected in step S60. Then, the master device 20 excludes the communication channel whose communication quality is determined to be reduced from the communication channels to be used for the wireless communication between the master device 20 and the slave device 30. The excluded communication channel is a communication channel for data. For example, an example of a condition for determining the reduction in the communication quality is that the RSSI is compared with a threshold value for the RSSI, and the PER is compared with a threshold value for the PER, and as a result, at least one of the RSSI and the PER is not satisfied with a condition of the threshold value. Here, the number of parameters to be compared with the threshold value may be one. Alternatively, the parameter to be compared with the threshold value may be the immediately preceding parameter detected in step S60, or may be an average or a center value of a predetermined number of parameters detected in multiple past wireless communications regarding the same communication channel.

In step S80, the master device 20 executes restoration determination of the excluded communication channel based on the exclusion determination at the time of the previous communication event. In this restoration determination, if a predetermined restoration condition is met, the excluded communication channel is restored as a communication channel to be used for wireless communication. For example, as an example of the predetermined restoration condition, an excluded communication channel may be restored when a predetermined period of time has elapsed since the communication channel was excluded. Alternatively, as another example of the predetermined restoration condition, in response to a communication channel adjacent to the excluded communication channel showing the excellent communication quality, the excluded communication channel may be restored as a communication channel to be used for wireless communication. In this way, the communication channel determined to be able to restore as a communication channel to be used for wireless communication is incorporated into the channel map and actually used for wireless communication between the master device 20 and the slave device 30. When the communication quality of restored communication channel remains low quality at the time of actual use for the wireless communication, the communication channel may be a target of deletion in the deletion determination again.

In step S90, the master device 20 performs channel map generation processing based on the exclusion determination result in step S70 and the restoration determination result in step S80. In this embodiment, an individual channel map is generated for each slave device 30 among a plurality of slave devices 30. Here, it is also possible to generate a common channel map for multiple slave devices 30. When generating a common channel map, it may be sufficient to perform an AND operation on the communication channels included in the channel map of each slave device 30 and extract a plurality of communication channels that are common to all of the channel map. When generating a common channel map, the common channel map may be generated from the channel map of the slave device 30 determined as the target of channel map control in the target slave device determination process described later.

The channel map may indicate communication channels that can be used for wireless communication, or may indicate communication channels that cannot be used for wireless communication. Alternatively, both the usable communication channels and the unusable communication channels may be indicated in the channel map. When there is a change in usable/unusable communication channels due to the creation of the channel map, the frequency channel hopping pattern may be updated. When the frequency channel hopping pattern is not updated or when the communication channel to be hopped cannot be used, the communication channel to be hopped for next communication event may be used.

In step S100, the master device 20 determines the slave device 30 as the target to which the channel map control is executed, according to the communication state of the wireless communication with each slave device 30. In the channel map control, as described above, based on the result of the communication channel deletion determination in step S70 and the result of the restoration determination of the deleted communication channel in step S80, the channel map is generated in step S90 so as to include only communication channels, for which a certain communication quality is ensured, in the channel map. The slave device 30 that is the execution target of this channel map control receives a channel map from the master device 20 through the channel map transmission process in step S120, which will be described later. When the slave device 30 receives a new channel map, the slave device 30 updates the channel map which is stored in the slave device 30 with the received new channel map. Conversely, a new channel map is not transmitted from the master device 20 to the slave devices 30 that are not the execution target of the channel map control. In this case, the slave device 30 continues to use the channel map which is stored in the slave device 30. The process of determining the slave device 30 to be the execution target of the channel map control is performed periodically. In accordance with the result, the slave device 30 that is the target of the channel map control is updated.

FIG. 5 is a flowchart showing an example of the target slave device determination process in step S100 of the flowchart of FIG. 4.

In step S310, the master device 20 acquires the PER calculated when the performing the wireless communication with each slave device 30, for example, to determine whether the communication state of the wireless communication with each slave device 30 is excellent or bad. In step S320, the master device 20 selects one slave device 30 as a target of which the communication state is to be determined from among the plurality of slave devices 30. Then, in step S330, the master device 20 determines whether the PER acquired for the selected slave device 30 is smaller than a threshold value. If the PER is smaller than the threshold, the communication state can be considered excellent. Therefore, in step S340, the master device 20 determines that the communication state of the slave device 30 as a target of which the communication state is to be determined is "normal". On the other hand, if the PER is equal to or larger than the threshold, the communication state cannot be considered to be excellent. Therefore, in step S350, the master device 20 determines that the communication state of the slave device 30 as a target of which the communication state is to be determined is "anomaly".

Here, the parameter for determining whether the communication state of the wireless communication with each slave device 30 is excellent or bad is not limited to the PER. For example, the master device 20 may use RSSI, SNR/SINR, BER, or PAR as parameters for determining the communication state of the wireless communication with each slave device 30. Further, the master device 20 may determine the communication state of the wireless communication with each slave device 30 by combining a plurality of parameters. Furthermore, the parameters for determining the communication state may be the parameters acquired in the previous wireless communication. Alternatively, the parameter may be an average value of a plurality of parameters acquired through multiple wireless communications. Furthermore, as a parameter for determining the communication state, the master device 20 may use the numerical number of communication channels available for the wireless communication corresponding to each slave device 30, that is, the number of communication channels included in the channel map corresponding to each slave device 30.

In step S360, the master device 20 determines whether the determination of the communication status of all slave devices 30 has been completed. If the communication status of all slave devices 30 has been determined, the master device 20 proceeds to step S370. On the other hand, if the determination of the communication status of all the slave devices 30 has not been completed, the master device 20 returns to step S320 and selects the slave device 30 whose communication status has not yet been determined.

In step S370, the master device 20 determines whether the communication status of all slave devices 30 has been determined to be "normal" through the processes of steps S320 to S360 described above. If the communication status of all slave devices 30 is determined to be "normal", the master device 20 proceeds to step S380. On the other hand, if the communication status of all the slave devices 30 is not determined to be "normal" but the communication status of some slave devices 30 is determined to be "anomaly", the master device 20 proceeds to step S390.

In step S380, the master device 20 determines all the slave devices 30 as slave devices 30 to be the target to which the channel map control is to be executed. On the other hand, in step S390, the master device 20 determines the slave device 30 whose communication state is determined to be "anomaly" as the slave device 30 to be the target to which the channel map control is to be executed.

Returning again to the flowchart of FIG. 4, the description will be continued. In step S110, the master device 20 determines whether the slave device 30, which has performed the wireless communication in the communication sequence shown in the flowchart of FIG. 4, is an execution target of the channel map control. If the slave device 30 is the execution target of the channel map control, the master device 20 proceeds to a channel map transmission process in step S120. On the other hand, if the slave device 30 is not the execution target of the channel map control, the master device 20 skips the channel map transmission process in step S120. Therefore, a new channel map is not transmitted to slave devices 30 other than the execution target of the channel map control.

Figure 6:
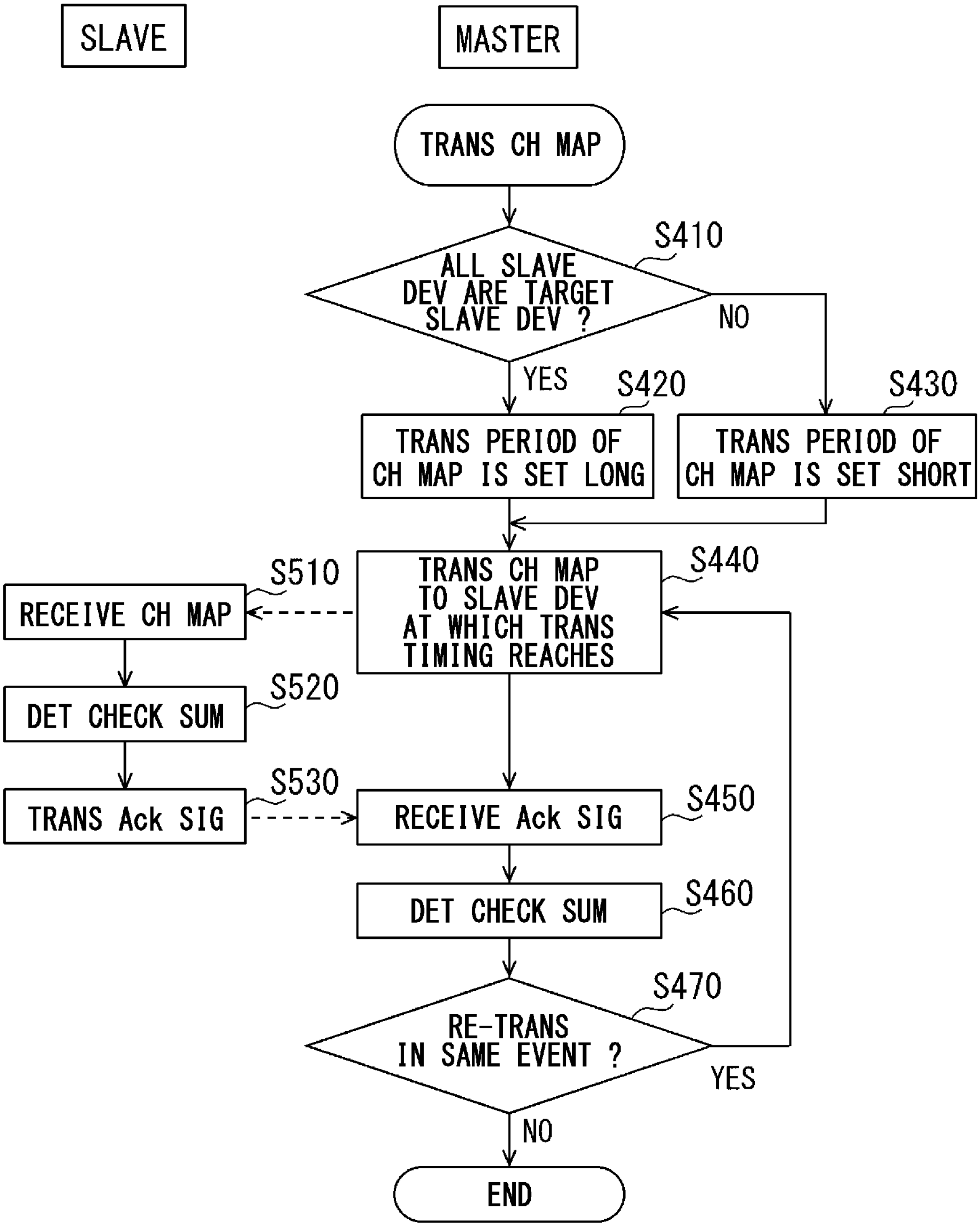
FIG. 6 is a flowchart illustrating an example of the channel map transmission process in the flowchart of FIG. 4.

FIG. 6 is a flowchart illustrating an example of the channel map transmission process in step S120 of the flowchart in FIG. 4.

In the first step S410, the master device 20 determines whether all slave devices 30 are the execution target of the channel map control. If all slave devices 30 are the execution target of the channel map control, the master device 20 proceeds to step S420. On the other hand, if all slave devices 30 are not the execution target of the channel map control, the master device 20 proceeds to step S430. In step S420, the master device 20 sets the channel map transmission period, in other words, the update period for channel map sharing to be the longest period. Specifically, the master device 20 sets the transmission period of the channel map to a period equal to or greater than the total period corresponding to the number of all slave devices 30. On the other hand, in step S430, the master device 20 sets the transmission period of the channel map to be shorter than the transmission period in step S420. Specifically, the master device 20 sets the channel map transmission period shorter than the channel map transmission period when all slave devices 30 are the execution target of the channel map control, and equal to or longer than the total channel map transmission period corresponding to the numerical number of the slave devices 30 as the execution target of the channel map control.

FIG. 7 is a timing flow chart showing an example of the update timing of the channel map of each slave device 30 when all of the slave devices 30 are the execution target of the channel map control. As shown in FIG. 7, in this embodiment, in order to distribute the processing load for channel map sharing in the master device 20, that is, the processing load for transmitting a new channel map from the master device 20 to each slave device 30, the master device 20 shifts the channel map transmission timing (i.e., the timing at which the channel map sharing is executed) between the individual slave devices 30. In the example shown in FIG. 7, the master device 20 performs the wireless communication with six slave devices 30. In the first communication period (i.e., in the first communication event), the master device 20 transmits a channel map to the slave device 30 defined as "S1". Thereafter, the master device 20 transmits the channel map to the slave device 30 defined as "S2" in the second communication period (i.e., in the second communication event), transmits the channel map to the slave device 30 defined as "S3" in the third communication period (i.e., in the third communication event), transmits the channel map to the slave device 30 defined as "S4" in the fourth communication period (i.e., in the fourth communication event), transmits the channel map to the slave device 30 defined as "S5" in the fifth communication period (i.e., in the fifth communication event), and transmits the channel map to the slave device 30 defined as "S6" in the sixth communication period (i.e., in the sixth communication event).

In each communication period (i.e., each communication event), as described above, the master device 20 communicates with each of the slave devices 30 defined as "S1" to "S6" in divided sub-communication events. Therefore, for example, in the first communication period (i.e., in the first communication event), the master device 20 performs the data communication with the slave device 30 defined as "S1" during the sub-communication event with the slave device 30 defined as "S1", and further transmits the channel map.

Here, the master device 20 does not necessarily have to shift the channel map transmission timing for each slave device 30. For example, when the control device (i.e., a processor) has enough processing power to transmit channel maps of two or more slave devices 30 in the same communication event, the master device 20 may execute the map transmission process for some (for example, two) slave devices 30 during the same communication event. In other words, the timing for performing the channel map transmission process may not be set to a different communication event for each slave device 30, but the timing for performing the channel map transmission process with respect to two or more slave devices 30 which are grouped into one group may be set at the same time (in the same communication event) while distributing over multiple timings (i.e., multiple communication events). In this case, for example, when setting the channel map transmission period to be the longest, the channel map transmission period is set to a period greater than or equal to a total period corresponding to the number of groups of slave devices 30.

As in the example shown in FIG. 7, when the channel map transmission timing is shifted for each slave device 30, the master device 20 sets the channel map transmission period to every six communication periods so that the channel map transmission process are not performed at the same time (i.e., in the same communication event) for two or more slave devices 30. Here, the six communication periods are just an example, and the channel map transmission period may be other communication periods as long as the period is equal to or longer than a total period corresponding to the number of slave devices 30 as the execution target of the channel map control. Alternatively, when the channel map transmission process is performed for two or more slave devices 30 at the same time, the channel map transmission period may be equal to or longer than a total period corresponding to the number of groups of the slave devices 30 for which the channel map transmission process is performed at the same time.

FIG. 8 is a time chart showing an example of the update timing of the channel map of each slave device 30 when the channel map control is performed for some slave devices 30 whose communication state is anomaly. In the example shown in FIG. 8, four slave devices 30 defined as "S2" to "S5" are the execution target of the channel map control. In the example shown in FIG. 8, similar to the example shown in FIG. 7, in order to shift the timing of transmitting the channel map to each slave device 30, the master device 20 transmits the channel map to the slave device 30 defined as "S2 in the first communication period (i.e., the first communication event). After that, the master device 20 transmits the channel map to the slave device 30 defined as "S3 in the second communication period (i.e., in the second communication event), transmits the channel map to the slave device 30 defined as "S4 in the third communication period (i.e., in the third communication event), and transmits the channel map to the slave device 30 defined as "S5" in the fourth communication period (i.e., in the fourth communication event). As in the example shown in FIG. 8, when the channel map transmission timing is shifted for each slave device 30, the channel map transmission period is set to every five communication periods so that the channel map transmission process are not performed at the same time (i.e., in the same communication event) for two or more slave devices 30. Here, the five communication periods are an example, and the channel map transmission period may be shorter than the channel map transmission period when all slave devices 30 are the execution target of the channel map control, and equal to or longer than a total period corresponding to the number of slave devices 30 as the execution target of the channel map control. Alternatively, the channel map transmission period may be shorter than the channel map transmission period when all slave devices 30 are the execution target of the channel map control, and equal to or longer than a total period corresponding to the number of groups of the slave devices 30 for which the channel map transmission process is executed at the same time.

In this embodiment, as shown in the examples of FIGS. 7 and 8, when the number of slave devices 30 determined to be the execution target of the channel map control is small, the channel map transmission period (i.e., the period at which the channel map sharing is performed) is set to be shorter than a case where the number of slave devices 30 determined as the execution target is large. This makes it possible to advance the timing of execution of the channel map sharing as a whole of slave devices 30 determined to be the execution target of the channel map control. As a result, it is possible to quickly improve the communication state of a slave device 30 whose communication state has deteriorated. In this way, the effectiveness of the channel map control can be increased.

In the example shown in the time charts of FIGS. 7 and 8, the transmission timing of the channel map is scheduled so that the channel map is transmitted to one slave device 30 for each communication event. In step S440 of the flowchart of FIG. 6, the channel map generated in step S90 is transmitted to the slave device 30 whose channel map transmission time has come. The corresponding slave device 30 receives the channel map in step S510. When the slave device 30 receives the channel map in step S510, the slave device 30 performs, for example, a check sum determination in step S520 based on the error detection code accompanying the received channel map to confirm whether or not the channel map has been correctly received. If the slave device 30 determines in the process of step S520 that the channel map has not been correctly received based on the checksum determination result, for example, in step S530, the slave device 30 transmits a signal indicating that the channel map has not been correctly received, or a signal requesting retransmission of the channel map. On the other hand, if the slave device 30 determines in the process of step S520 that the channel map has been correctly received, the slave device 30 updates the channel map stored therein to the newly received channel map. Then, in step S530, the slave device 30 transmits a channel map reception confirmation signal (i.e., an acknowledge signal or Ack signal) to the master device 20.

The master device 20 receives the Ack signal in step S450. In S460, the master device 20 performs, for example, the checksum determination based on the error detection code included in the received Ack signal in order to confirm whether the Ack signal has been correctly received. In the following step S470, the master device 20 determines whether a process for the retransmission in the same communication event is to be executed when it is determined that the Ack signal has not been correctly received, when receiving a signal from the slave device 30 indicating that the channel map is not correctly received, or a signal for requesting the retransmission of the channel map. For example, the master device 20 may determine execution of retransmission when there is enough time to perform retransmission until the end time of the current communication event (or, sub-communication event), and may determine non-execution of retransmission when there is no enough time until the end time of the current communication event. In S470, when the master device 20 determines to execute the retransmission, the master device 20 executes the process from S440 again. If it is determined that the Ack signal has been correctly received, or if it is determined in step S470 not to perform the retransmission, the master device 20 ends the channel map transmission process.

Second Embodiment

Next, a wireless communication system 10 according to a second embodiment of the present disclosure will be described with reference to the drawings. Since the wireless communication system 10 according to the present embodiment has similar configuration to the wireless communication system 10 of the first embodiment, description of the similar configuration will be omitted.

In the wireless communication system 10 according to the first embodiment, the communication state of the wireless communication with each slave device 30 is classified into "normal" and "anomaly" by comparing the PER with a threshold value. When channel map control is performed for the slave devices 30 as a target whose communication state has been determined to be "anomaly," the channel map transmission period is set to be shorter than the transmission period of the channel map when the communication state of all slave devices 30 is determined to be "normal." On the other hand, in the wireless communication system 10 according to the second embodiment, the communication state of the wireless communication with each slave device 30 is classified into three or more levels including "normal", "temporary communication interruption", and "continuous communication interruption" according to the length of the communication interruption period, and the transmission timing of the channel map is controlled more appropriately according to each communication state which is classified.

Hereinafter, a target slave device determination process for determining a slave device 30 as an execution target of the channel map control, and a channel map transmission process for transmitting the channel map to the slave device 30 as the execution target, which are performed in the wireless communication system 10 according to the present embodiment will be explained with reference to the flowcharts of FIGS. 9 and 10.

Figure 9:
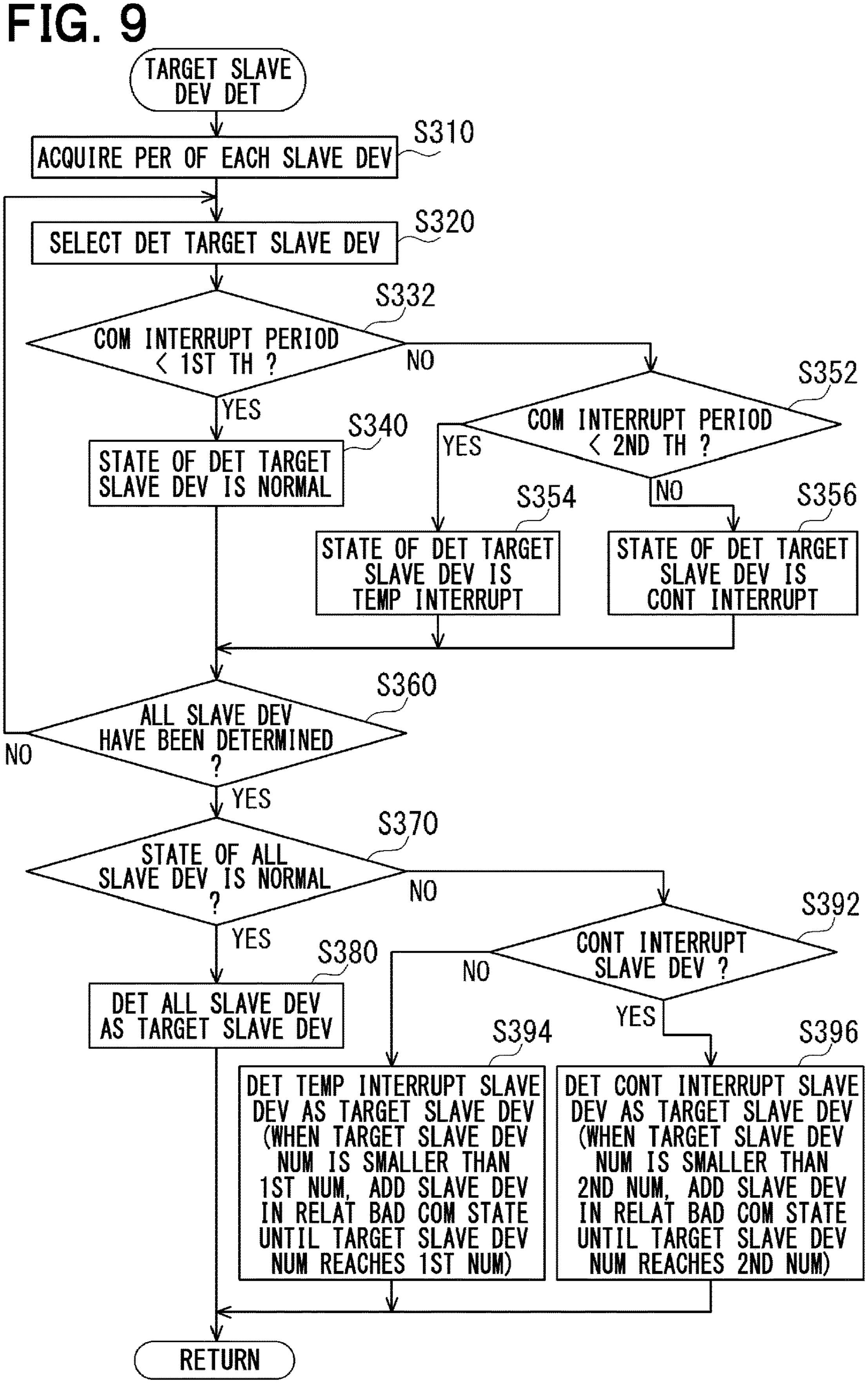
FIG. 9 is a flowchart illustrating an example of the target slave device determination process according to the second embodiment.

The target slave device determination process of the second embodiment shown in the flowchart of FIG. 9 differs from the target slave device determination process of the first embodiment shown in the flowchart of FIG. 5 such that steps S330, S350 and S390 are deleted, and steps S332, S352, S354, S356, S392, S394, and S396 are added. Regarding other processes, there is no difference between the target slave device determination process shown in the flowchart of FIG. 9 and the target slave device determination process shown in the flowchart of FIG. 5. Therefore, the points that are different from the first embodiment will be mainly explained below.

In the target slave device determination process shown in the flowchart of FIG. 9, it is determined in step S332 whether the communication interruption period is less than a first threshold. The communication interruption period is defined, for example, as a period in which packet errors (or bit errors) occur continuously. Therefore, the communication interruption period can be detected, for example, by a timer that starts counting when the first packet error is detected and is reset when a packet is properly received. If the communication interruption period is less than the first threshold, the communication state can be considered normal. Therefore, the master device 20 determines that the communication state of the determination target slave device 30 is "normal" in step S340.

On the other hand, if the communication interruption period is equal to or greater than the first threshold, the master device 20 proceeds to step S352. In step S352, the master device 20 further determines whether the communication interruption period is less than the second threshold. When the communication interruption period exceeds the first threshold and is smaller than the second threshold, the communication state of the wireless communication with the slave device 30 has deteriorated, but the degree of deterioration can be considered to be slight. Therefore, if the communication interruption period is less than the second threshold, in step S354, the master device 20 determines that the communication state of the wireless communication of the determination target slave device 30 is in a "temporary communication interruption" state indicating a slight deterioration. However, if the communication interruption period is equal to or greater than the second threshold, the communication state of the wireless communication with the slave device 30 has deteriorated, and the degree of deterioration can be considered to be severe. Therefore, if the communication interruption period is equal to or greater than the second threshold, in step S356, the master device 20 determines that the communication state of the wireless communication of the determination target slave device 30 is in a "continuous communication interruption" state indicating a severe deterioration.

Here, the degree of deterioration of the communication state may be determined not only by comparing the above-mentioned communication interruption period with the first threshold value and the second threshold value, but also by comparing, for example, the PER, the BER, the PAR, the RSSI, and the SNR/SINR, which indicate the communication quality of the wireless communication of each slave device 30, with a plurality of threshold values.

In the target slave device determination process shown in the flowchart of FIG. 9, if the communication state of all slave devices 30 is not determined to be "normal" in step S370, the process of step S392 is executed. In step S392, the master device 20 determines whether there is any slave device 30 in a "continuous communication interruption" state, which indicates a severe deterioration of the communication state. If there is no slave device 30 in the "continuous communication interruption" state, that is, if there is only a slave device 30 in the "temporary communication interruption" state indicating a slight deterioration of the communication state, the master device 20 proceeds to step S394. On the other hand, if there is a slave device 30 in the "continuous communication interruption" state, the master device 20 proceeds to step S396.

In step S394, the master device 20 determines the slave device 30 in the "temporary communication interruption" state as an execution target of the channel map control. On the other hand, in step S396, the master device 20 determines the slave device 30 in the "continuous communication interruption" state as an execution target of the channel map control.

Here, in this embodiment as well, similarly to the first embodiment, when the communication state of all the slave devices 30 is "normal", the transmission period of the channel map is set the longest, as shown in an example of the time chart in FIG. 7. When the communication state of at least one slave device 30 is "temporary communication interruption" state, the channel map transmission period is set to be shorter than the longest transmission period, as shown in the time chart of FIG. 8. In this short transmission period, for example, in order to avoid transmitting a channel map to two or more slave devices 30 at the same time in the same communication event, the numerical number of slave devices 30 that can be set as the execution target of the channel map control is limited. When this limited number is set as the first number, if the number of slave devices 30 in the "temporary communication interruption" state is less than the first number, the slave device 30 in a relatively bad communication state may be added as the execution target of the channel map control unit the number of the execution target reaches the first number. Conversely, for example, if the number of slave devices 30 in the "temporary communication interruption" state is greater than the first number, the slave devices 30 with the relatively better communication state may be excluded from the execution target of the channel map control until the number of the execution target reaches the first number. Here, the communication state of each slave device 30 can be ranked based on the above-mentioned communication quality data and/or the number of communication channels that can be used for wireless communication.

Furthermore, when the communication state of at least one slave device 30 is a "continuous communication interruption" state, the transmission period of the channel map is set to be shorter than the longest transmission period. In addition, as will be described in detail later, the transmission timing of the channel map is set so that the channel map is transmitted during the same communication event to the slave device 30 that is the execution target of the channel map control. Therefore, due to the relationship between the processing load required to transmit a channel map during the same communication event and the processing power of the control device (i.e., the processor) for executing the process, the number of slave devices 30 possible to be the execution target of the channel map control is limited. When this limited number is set as the second number, if the number of slave devices 30 in the "continuous communication interruption" state is less than the second number, the slave device 30 in a relatively bad communication state may be added as the execution target of the channel map control unit the number of the execution target reaches the second number. Conversely, for example, if the number of slave devices 30 in the "continuous communication interruption" state is greater than the second number, the slave devices 30 with the relatively better communication state may be excluded from the execution target of the channel map control until the number of the execution target reaches the second number.

Figure 10:
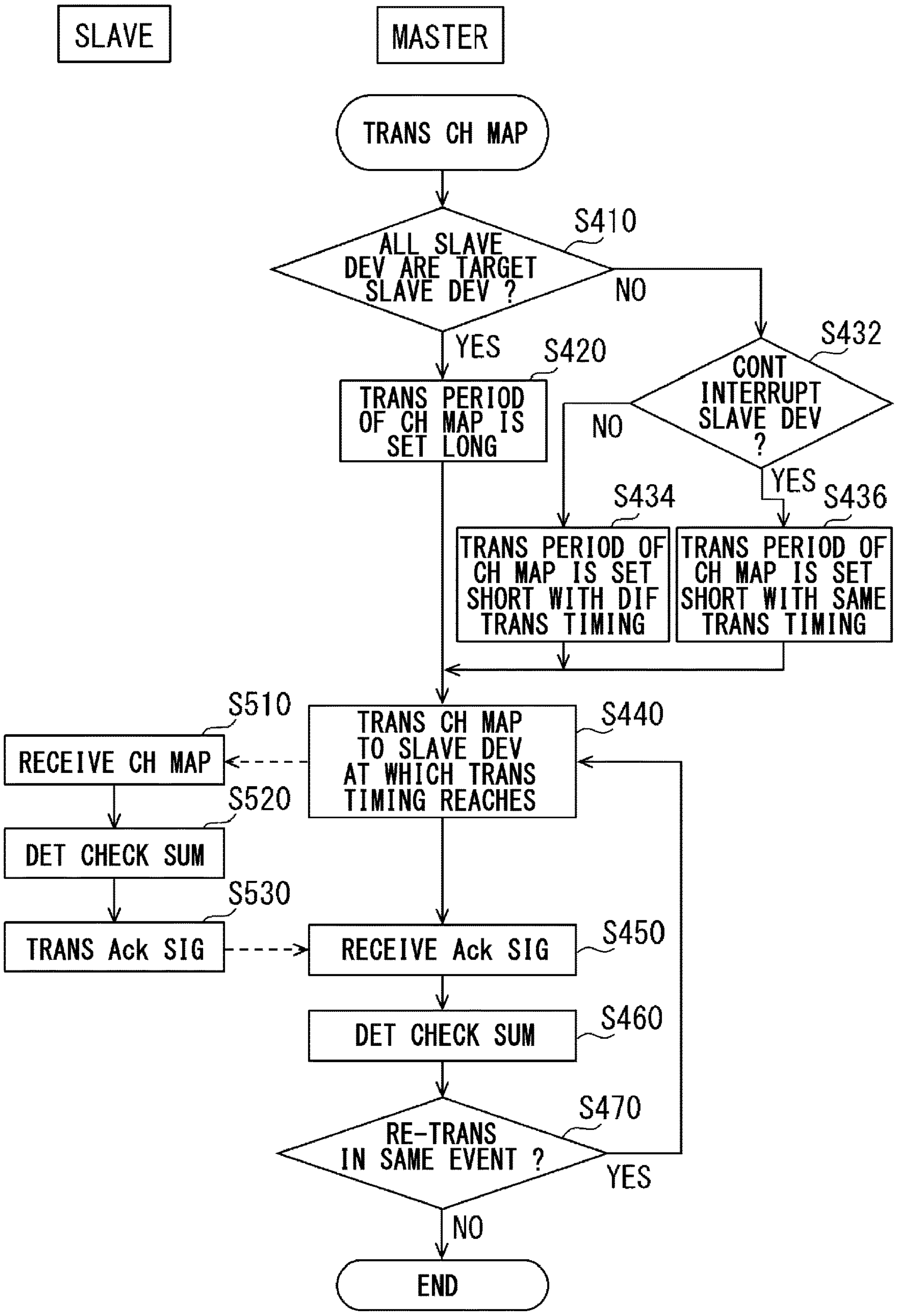
FIG. 10 is a flowchart showing an example of a channel map transmission process according to the second embodiment.

The channel map transmission process of the second embodiment shown in the flowchart of FIG. 10 differs from the channel map transmission process of the first embodiment shown in the flowchart of FIG. 6 in that the process of step S430 is deleted, and instead, the processes of steps S432, S434 and S436 are added. Regarding other processing, there is no difference between the channel map transmission process shown in the flowchart of FIG. 10 and the channel map transmission process shown in the flowchart of FIG. 5. Therefore, the points that are different from the first embodiment will be mainly explained below.

In the channel map transmission process shown in the flowchart of FIG. 10, if it is determined in step S410 that all slave devices 30 are not the execution target of the channel map control, the master device 20 executes the process in step S432. In step S432, the master device 20 determines whether or not the slave devices 30 that are the execution target of the channel map control include a slave device 30 in a "continuous communication interruption" state. If it is determined that the slave devices 30 that are the execution target of the channel map control do not include the slave devices 30 that are in a "continuous communication interruption" state, that is, only slave devices 30 that are in a "temporary communication interruption" state are included, the master device 20 proceeds to step S434. On the other hand, if the master device 20 determines that the slave devices 30 that are the execution target of the channel map control include the slave device 30 in the "continuous communication interruption" state, the master device 20 proceeds to step S436.

In step S434, the master device 20 sets the channel map transmission period to be shorter than the transmission period in step S420, while setting the channel map transmission timing different for each slave device 30 that is the execution target of the channel map control. A specific example of setting the transmission period is the same as in the first embodiment described above. Therefore, the timing of transmitting the channel map to each slave device 30 that is the execution target of the channel map control is the same as that shown in the time chart of FIG. 8.

On the other hand, in step S436, the master device 20 sets the channel map transmission timing at the same time in each slave device 30 that is the execution target of the channel map control, and sets the channel map transmission period to be shorter than the transmission period in step S420. This transmission period may be the same as the transmission period in step S434, or may be shorter than the transmission period in step S434. The time chart in FIG. 11 shows an example of the timing at which the channel map is transmitted to each slave device 30 when the channel map transmission timing and the transmission period are set in step S436.

In the example shown in FIG. 11, three slave devices 30 defined as "S3" to "S5" are the execution target of the channel map control. In the example shown in FIG. 11, unlike the examples shown in FIGS. 7 and 8, the channel map is transmitted to the slave devices 30 defined as "S3" to "S5" in the same communication event (i.e., in the communication period 1, the communication period 6 or the communication period 6). Here, the transmission period of the channel map is 5 communication periods, which is the same as the transmission period of the channel map in the example shown in the time chart of FIG. 8. In this way, even if the transmission period is the same, by setting the transmission timing of the channel map to the same timing in the plurality of slave devices 30 that are the execution target of the channel map control, the transmission timing of the channel map is advanced as a whole of the plurality of slave devices 30.

Although embodiments of the present disclosure have been described above, the present disclosure is not limited to the above-described embodiments, and various modifications can be made without departing from the spirit of the present disclosure.

The present disclosure discloses multiple technical ideas listed below and multiple combinations thereof. The following combination of technical features applies not only to the wireless communication system 10 but also to the wireless communication method and the wireless communication program.

(First Technical Feature)

A wireless communication system executes a wireless communication between a master device (20) and at least one slave device (30) using a communication channel, which is sequentially selected from a plurality of communication channels.

A plurality of the slave devices are provided, and the master device performs the wireless communication with each of the plurality of slave devices.

The wireless communication system includes: at least one processor; and at least one memory storing computer program code.

The at least one memory and the computer program code are configured, with the at least one processor, to cause the wireless communication system to provide:

- a communication channel determination unit that determines a communication quality of each communication channel for each slave device when the master device communicates wirelessly with the plurality of slave devices, and determines the communication channel to be used for the wireless communication based on a determination result of the communication quality of each communication channel;
- a channel map share unit that causes the master device to transmit a channel map indicating the communication channel determined by the communication channel determination unit to the at least one slave device, and shares the channel map between the master device and the at least one slave device;
- a slave device determination unit that determines the slave device as a sharing target to which sharing of the channel map with the master device is executed by the channel map share unit according to a communication state of the wireless communication between the master device and each of the plurality of slave devices; and
- a timing change unit that advances a timing to execute sharing the channel map by the channel map share unit as a whole of slave devices determined as the sharing target in a case where a numerical number of slave devices determined by the slave device determination unit is small, compared with a case where the numerical number of slave devices determined by the slave device determination unit is large.

(Second Technical Feature)

In the wireless communication system according to the first technical feature, the slave device determination unit is configured to determine a smaller numerical number of the slave devices than a numerical number of all slave devices as the sharing target to which the sharing of the channel map is executed by the channel map share unit in a case where a communication state of the wireless communication with at least one of the slave devices deteriorates, compared with a case where the communication state of the wireless communication with all of the slave devices is excellent.

(Third Technical Feature)

In the wireless communication system according to the second technical feature, the slave device determination unit determines the smaller numerical number of the slave devices in decreasing order of a degree of deterioration of the communication state in the slave devices.

(Fourth Technical Feature)

In the wireless communication system according to any one of the first to the third technical features, when the communication state of the wireless communication with at least one of the slave devices is a first communication state indicating that the communication state deteriorates, the slave device determination unit determines a first numerical number of the slave devices including the at least one of the slave devices smaller than the numerical number of all slave devices as the sharing target to which the sharing of the channel map is executed by the channel map share unit.

(Fifth Technical Feature)

In the wireless communication system according to the fourth technical feature, when the communication state of the wireless communication with the at least one of the slave devices is a second communication state indicating that the communication state deteriorates worse than the first communication state, the slave device determination unit determines a second numerical number of the slave devices including the at least one of the slave devices smaller than the first numerical number of the slave devices as the sharing target to which the sharing of the channel map is executed by the channel map share unit.

(Sixth Technical Feature)

In the wireless communication system according to the fourth or fifth technical feature, the slave device determination unit determines a deterioration in the communication state between the master device and the plurality of slave devices based on a period during which the wireless communication is interrupted.

(Seventh Technical Feature)

In the wireless communication system according to any one of the first to the sixth technical features, the channel map share unit periodically shares a latest channel map between the master device and the at least one of the slave devices.

The timing change unit is configured to advances the timing to execute sharing the channel map by the channel map share unit as a whole of slave devices determined as the sharing target by shortening a period for executing the sharing of the channel map in a case where the numerical number of the slave devices determined by the slave device determination unit is small, compared with a case where the numerical number of slave devices determined by the slave device determination unit is large.

(Eighth Technical Feature)

In the wireless communication system according to any one of the first to the seventh technical features, when the numerical number of slave devices determined by the slave device determination unit is large, the timing change unit is configured to shift a timing to execute the sharing of the channel map by the channel map share unit to be different timings with respect to the numerical number of slave devices determined by the slave device determination unit. When the numerical number of slave devices determined by the slave device determination unit is small, the channel map share unit advances the timing to execute sharing the channel map by the channel map share unit as a whole of slave devices determined as the sharing target by executing the sharing of the channel map with respect to the numerical number of slave devices determined by the slave device determination unit at a same time.

(Ninth Technical Feature)

In the wireless communication system according to any one of the first to the eighth technical features, when the master device is in a communication state in which the master device normally and wirelessly communicates with each of the plurality of slave devices, the slave device determination unit determines all of the slave devices as the sharing target to which the sharing of the channel map is executed by the channel map share unit.

(Tenth Technical Feature)

In the wireless communication system according to the ninth technical feature, the channel map share unit periodically shares a latest channel map between the master device and the at least one of the slave devices.

The timing change unit is configured to delays the timing to execute sharing the channel map by the channel map share unit as a whole of slave devices determined as the sharing target by setting a period for executing the sharing of the channel map to be a longest in a case where the slave device determination unit determines all of the slave devices as the sharing target to which the sharing of the channel map is executed by the channel map share unit.

(Eleventh Technical Feature)

In the wireless communication system according to the ninth or tenth technical feature, when the slave device determination unit determines all of the slave devices as the sharing target to which the sharing of the channel map is executed by the channel map share unit, the timing change unit is configured to shift the timing to execute the sharing of the channel map by the channel map share unit to be different timings with respect to all of the slave devices determined as the sharing target to distribute a processing load for sharing the channel map.

(Twelfth Technical Feature)

In the wireless communication system according to any one of the first to the eleventh technical features, the slave device determination unit determines the slave device as the sharing target to which the sharing of the channel map is executed by the channel map share unit, according to at least one of a packet error rate (i.e., PER), a bit error rate (i.e., BER), a packet arrival rate (i.e., PAR), a reception signal strength indicator (i.e., RSSI), a signal-to-noise ratio (i.e., SNR), and a signal-interference-to-noise ratio (i.e., SINR) when the master device performs the wireless communication with each of the plurality of slave devices.

(Thirteenth Technical Feature)

In the wireless communication system according to any one of the first to the eleventh technical features, the slave device determination unit determines the slave device as the sharing target to which the sharing of the channel map is executed by the channel map share unit according to a numerical number of communication channels capable of being used for the wireless communication for each of the slave devices.

(Fourteenth Technical Feature)

In the wireless communication system according to any one of the first to the thirteenth technical features, the slave device determination unit periodically updates determination of the slave device as the sharing target to which the sharing of the channel map is executed.

In the present disclosure, the term "processor" may refer to a single hardware processor or several hardware processors that are configured to execute computer program code (i.e., one or more instructions of a program). In other words, a processor may be one or more programmable hardware devices. For instance, a processor may be a general-purpose or embedded processor and include, but not necessarily limited to, CPU (a Central Processing Circuit), a microprocessor, a microcontroller, and PLD (a Programmable Logic Device) such as FPGA (a Field Programmable Gate Array).

The term "memory" in the present disclosure may refer to a single or several hardware memory configured to store computer program code (i.e., one or more instructions of a program) and/or data accessible by a processor. A memory may be implemented using any suitable memory technology, such as static random-access memory (SRAM), synchronous dynamic RAM (SDRAM), nonvolatile/Flash-type memory, or any other type of memory. Computer program code may be stored on the memory and, when executed by a processor, cause the processor to perform the above-described various functions.

In the present disclosure, the term "circuit" may refer to a single hardware logical circuit or several hardware logical circuits (in other words, "circuitry") that are configured to perform one or more functions. In other words (and in contrast to the term "processor"), the term "circuit" refers to one or more non-programmable circuits. For instance, a circuit may be IC (an Integrated Circuit) such as ASIC (an application-specific integrated circuit) and any other types of non-programmable circuits.

In the present disclosure, the phrase "at least one of (i) a circuit and (ii) a processor" should be understood as disjunctive (logical disjunction) where the circuit and the processor can be optional and not be construed to mean "at least one of a circuit and at least one of a processor". Therefore, in the present disclosure, the phrase "at least one of a circuit and a processor is configured to cause wireless communication system to perform functions" should be understood that (i) only the circuit can cause wireless communication system to perform all the functions, (ii) only the processor can cause wireless communication system to perform all the functions, or (iii) the circuit can cause wireless communication system to perform at least one of the functions and the processor can cause wireless communication system to perform the remaining functions. For instance, in the case of the above-described (iii), function A and B among the functions A to C may be implemented by a circuit, while the remaining function C may be implemented by a processor."

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A wireless communication system for executing a wireless communication between a master device and at least one slave device using a communication channel, which is sequentially selected from a plurality of communication channels, the at least one slave device including a plurality of slave devices, and the master device performing the wireless communication with each of the plurality of slave devices, the wireless communication system comprising:

a master device having at least one of (i) a circuit and (ii) a processor with a memory storing computer program code executable by the processor; and at least one slave device having at least one of (i) another circuit and (ii) another processor with another memory storing computer program code executable by the processor;

a communication channel determination unit that determines a communication quality of each communication channel for each slave device when the master device communicates wirelessly with the plurality of slave devices, and determines the communication channel to be used for the wireless communication based on a determination result of the communication quality of each communication channel;

a channel map share unit that causes the master device to transmit a channel map indicating the communication channel determined by the communication channel determination unit to the at least one slave device, and shares the channel map between the master device and the at least one slave device;

a slave device determination unit that determines the at least one slave device as a sharing target to which sharing of the channel map with the master device is executed by the channel map share unit according to a communication state of the wireless communication between the master device and each of the plurality of slave devices; and a timing change unit that advances a timing to execute sharing the channel map by the channel map share unit as a whole of slave devices determined as the sharing target in a case where a numerical number of slave devices determined by the slave device determination unit is small, compared with a case where the numerical number of slave devices determined by the slave device determination unit is large.

2. The wireless communication system according to claim 1, wherein:

the slave device determination unit is configured to determine a smaller numerical number of the slave devices than a numerical number of all of the slave devices as the sharing target to which the sharing of the channel map is executed by the channel map share unit in a case where a communication state of the wireless communication with at least one of the slave devices deteriorates, compared with a case where the communication state of the wireless communication with all of the slave devices is excellent.

3. The wireless communication system according to claim 2, wherein:

the slave device determination unit determines the smaller numerical number of the slave devices in decreasing order of a degree of deterioration of the communication state in the slave devices.

4. The wireless communication system according to claim 1, wherein:

when the communication state of the wireless communication with at least one of the slave devices is a first communication state indicating that the communication state deteriorates, the slave device determination unit determines a first numerical number of the slave devices including the at least one of the slave devices smaller than the numerical number of all of the slave devices as the sharing target to which the sharing of the channel map is executed by the channel map share unit.

5. The wireless communication system according to claim 4, wherein:

when the communication state of the wireless communication with the at least one of the slave devices is a second communication state indicating that the communication state deteriorates worse than the first communication state, the slave device determination unit determines a second numerical number of the slave devices including the at least one of the slave devices smaller than the first numerical number of the slave devices as the sharing target to which the sharing of the channel map is executed by the channel map share unit.

6. The wireless communication system according to claim 4, wherein:

the slave device determination unit determines a deterioration in the communication state between the master device and the plurality of slave devices based on a period during which the wireless communication is interrupted.

7. The wireless communication system according to claim 1, wherein:

the channel map share unit periodically shares a latest channel map between the master device and at least one of the slave devices; and the timing change unit is configured to advances the timing to execute sharing the channel map by the channel map share unit as a whole of slave devices determined as the sharing target by shortening a period for executing the sharing of the channel map in a case where the numerical number of the slave devices determined by the slave device determination unit is small, compared with a case where the numerical number of slave devices determined by the slave device determination unit is large.

8. The wireless communication system according to claim 1, wherein:

when the numerical number of slave devices determined by the slave device determination unit is large, the timing change unit is configured to shift a timing to execute the sharing of the channel map by the channel map share unit to be different timings with respect to the numerical number of slave devices determined by the slave device determination unit; and when the numerical number of slave devices determined by the slave device determination unit is small, the channel map share unit advances the timing to execute sharing the channel map by the channel map share unit as a whole of slave devices determined as the sharing target by executing the sharing of the channel map with respect to the numerical number of slave devices determined by the slave device determination unit at a same time.

9. The wireless communication system according to claim 1, wherein:

when the master device is in a communication state in which the master device normally and wirelessly communicates with each of the plurality of slave devices, the slave device determination unit determines all of the slave devices as the sharing target to which the sharing of the channel map is executed by the channel map share unit.

10. The wireless communication system according to claim 9, wherein:

the channel map share unit periodically shares a latest channel map between the master device and at least one of the slave devices; and the timing change unit is configured to delays the timing to execute sharing the channel map by the channel map share unit as a whole of slave devices determined as the sharing target by setting a period for executing the sharing of the channel map to be a longest in a case where the slave device determination unit determines all of the slave devices as the sharing target to which the sharing of the channel map is executed by the channel map share unit.

11. The wireless communication system according to claim 9, wherein:

when the slave device determination unit determines all of the slave devices as the sharing target to which the sharing of the channel map is executed by the channel map share unit, the timing change unit is configured to shift the timing to execute the sharing of the channel map by the channel map share unit to be different timings with respect to all of the slave devices determined as the sharing target to distribute a processing load for sharing the channel map.

12. The wireless communication system according to claim 1, wherein:

the slave device determination unit determines the at least one slave device as the sharing target to which the sharing of the channel map is executed by the channel map share unit, according to at least one of a packet error rate, a bit error rate, a packet arrival rate, a reception signal strength indicator, a signal-to-noise ratio, and a signal-interference-to-noise ratio when the master device performs the wireless communication with each of the plurality of slave devices.

13. The wireless communication system according to claim 1, wherein:

the slave device determination unit determines the slave device as the sharing target to which the sharing of the channel map is executed by the channel map share unit according to a numerical number of communication channels capable of being used for the wireless communication for each of the slave devices.

14. The wireless communication system according to claim 1, wherein:

the slave device determination unit periodically updates determination of the at least one slave device as the sharing target to which the sharing of the channel map is executed.

15. The wireless communication system according to claim 1, further comprising:

at least one of (i) a circuit and (ii) a processor having a memory storing computer program code, wherein:

the at least one of the circuit and the processor having the memory is configured to cause the wireless communication system to provide at least one of: the communication channel determination unit; the channel map share unit; the slave device determination unit; and the timing change unit.

16. A wireless communication method for executing a wireless communication between a master device and at least one slave device using a communication channel, which is sequentially selected from a plurality of communication channels, the at least one slave device including a plurality of slave devices, and the master device performing the wireless communication with each of the plurality of slave devices, the wireless communication method comprising:

a communication channel determination step for determining a communication quality of each communication channel for each slave device when the master device communicates wirelessly with the plurality of slave devices, and determining the communication channel to be used for the wireless communication based on a determination result of the communication quality of each communication channel;

a channel map share step for causing the master device to transmit a channel map indicating the communication channel determined in the communication channel determination step to the at least one slave device, and sharing the channel map between the master device and the at least one slave device;

a slave device determination step for determining the slave device as a sharing target to which sharing of the channel map with the master device is executed in the channel map share step according to a communication state of the wireless communication between the master device and each of the plurality of slave devices; and a timing change step for advancing a timing to execute sharing the channel map in the channel map share step as a whole of slave devices determined as the sharing target in a case where a numerical number of slave devices determined in the slave device determination step is small, compared with a case where the numerical number of slave devices determined in the slave device determination step is large.

17. A non-transitory tangible computer readable storage medium comprising instructions being executed by at least one processor for causing a master device to wirelessly communicate with at least one slave device via a communication channel sequentially selected from a plurality of communication channels, the at least one slave device including a plurality of slave devices, and the master device performing a wireless communication with each of the plurality of slave devices, when executing the instructions, at least one processor providing:

a communication channel determination function for determining a communication quality of each communication channel for each slave device when the master device communicates wirelessly with the plurality of slave devices, and determining the communication channel to be used for the wireless communication based on a determination result of the communication quality of each communication channel;

a channel map share function for causing the master device to transmit a channel map indicating the communication channel determined by the communication channel determination function to the at least one slave device, and shares the channel map between the master device and the at least one slave device;

a slave device determination function for determining the slave device as a sharing target to which sharing of the channel map with the master device is executed by the channel map share function according to a communication state of the wireless communication between the master device and each of the plurality of slave devices; and a timing change function for advancing a timing to execute sharing the channel map by the channel map share function as a whole of slave devices determined as the sharing target in a case where a numerical number of slave devices determined by the slave device determination function is small, compared with a case where the numerical number of slave devices determined by the slave device determination function is large.

* * * * *